United States Patent
Butterworth

(10) Patent No.: US 6,866,120 B1
(45) Date of Patent: Mar. 15, 2005

(54) PORTABLE TREE STAND HAVING SEATING AND STANDING PLATFORMS ADJUSTABLE TO TREE ANGLE

(76) Inventor: Charles Butterworth, 38055 Mt. Union Rd., Pomeroy, OH (US) 45769

( * ) Notice: Subject to any disclaimer, the term of this patent is extended or adjusted under 35 U.S.C. 154(b) by 0 days.

(21) Appl. No.: 10/644,457

(22) Filed: Aug. 20, 2003

(51) Int. Cl.[7] .......................... E04G 3/00; A63B 27/00; A47B 5/00
(52) U.S. Cl. ................... 182/187; 182/135; 108/152
(58) Field of Search ................. 182/135, 136, 182/187, 188, 116, 20; 297/217.1; 108/152

(56) References Cited

U.S. PATENT DOCUMENTS

| | | | |
|---|---|---|---|
| 4,549,635 A | * 10/1985 | Early | 182/187 |
| 4,819,763 A | 4/1989 | Grote | |
| 4,936,416 A | 6/1990 | Garon | |
| 5,199,527 A | 4/1993 | Jennings | |
| 5,868,221 A | 2/1999 | Brack, Jr. | |
| RE36,276 E | * 8/1999 | Smith | 182/187 |
| 5,954,158 A | 9/1999 | Concepcion | |
| 6,085,868 A | * 7/2000 | Anthony et al. | 182/187 |
| 6,196,354 B1 | 3/2001 | Anthony et al. | |
| 6,367,585 B1 | * 4/2002 | Fast | 182/187 |
| 6,386,321 B1 | 5/2002 | Muhich | |
| 6,568,505 B1 | 5/2003 | D'Acquisto | |
| 6,571,916 B1 | 6/2003 | Swanson | |
| 6,578,913 B2 | * 6/2003 | Wilhelm | 297/217.7 |
| 6,722,472 B2 | * 4/2004 | Berkbuegler | 182/187 |

* cited by examiner

Primary Examiner—Hugh B. Thompson, II
(74) Attorney, Agent, or Firm—David J. Dawsey; Michael J. Gallagher; Gallagher and Dawsey Co., LPA

(57) ABSTRACT

A portable tree stand for use with non-vertical trees provides standing and seating platforms that may remain parallel and may be adjustable. Adjustments include a slidable seat platform and a slidable standing platform that may be extended to allow adequate seating and standing space to compensate for tree trunks that diverge from the vertical. Additionally, the distance, or height, between the standing platform and the seating platform maybe varied. A threaded chain tensioner tightens a chain around the tree helping hold the stand to the tree, and optionally a tree screw secures attachment to the tree trunk. An adjustable seat support post establishes a parallelogram relationship between the seat platform and the standing platform such that an angular relationship, which may be parallel or non-parallel, may be maintained between the seat platform and the standing platform.

20 Claims, 9 Drawing Sheets

PORTABLE TREE STAND HAVING SEATING AND STANDING PLATFORMS ADJUSTABLE TO TREE ANGLE

TECHNICAL FIELD

The present invention relates to the field tree stands utilized by hunters and sportsmen; and particularly to a portable tree stand for use with non-vertical trees whereby the standing and seating platforms may remain parallel and may be adjustable.

BACKGROUND OF THE INVENTION

The use of tree stands by sportsmen is well known in the prior art prior art tree stands have basically consisted of familiar, expected, and obvious structural configurations designed to fulfill a particular need or requirement. Very few prior art tree stands have addressed the issues surrounding the fact that tree stands are generally not installed on perfectly vertical trees. Such installations of conventional tree stands in non-vertical trees illustrate the myriad of issues that the prior art has left unsolved. A majority of these issues are very dangerous given that most tree stands are used during hunting.

The portable tree stand of the present invention substantially departs from the conventional concepts and designs of the prior art, and in so doing provides an apparatus developed for offering a lightweight portable tree stand that securely attaches to virtually any tree in a quick and easy fashion, while providing improved safety via adjustable seating and standing platforms. While some of the prior art devices attempted to improve the state of the art, none have achieved the beneficial attributes of the present invention. With these capabilities taken into consideration, the instant invention addresses many of the shortcomings of the prior art and offers significant benefits heretofore unavailable. Further, none of the known prior art, taken either singly or in combination, is seen to describe the instant invention as claimed.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

In one of the simplest configurations, the portable tree stand of the present invention is designed to be releasably secured to a non-vertical tree. It includes a standing platform, a seating platform, a mounting structure, and a seat support post that maintains a predetermined angular relationship between the standing platform and the seating platform.

The standing platform has a standing platform deck, at least one standing platform support, a support post receiver, and at least one platform retainer releasably secured to the standing platform. The seating platform has a seating platform deck, a seating support assembly, and a support post mount. The mounting structure has a mounting chain and an attachment member to releasably secure the platform retainer and the mounting chain to the mounting structure. The seating platform assembly and standing platform are rotably connected to the mounting structure. Additionally, the attachment member is connected to the mounting structure and includes a chain tightening assembly attached to the mounting chain and a mounting chain receiver slot for releasably receiving the mounting chain encircling the tree. The mounting chain and chain tightening assembly may impart a tensile load on the mounting chain to grip the tree. Lastly, the seat support post has a proximal end and a distal end, wherein the seat support post is rotably connected to the support post mount substantially near the distal end and the proximal end is adjustably received by the support post receiver.

The unique construction and assembly of these components enable the standing platform deck and the seating platform deck to remain in a predetermined angular relationship despite a non-orthogonal relationship between the mounting structure and the standing platform deck or the seating platform deck. The configuration of the seat support post relative to the seating platform and the standing platform creates a parallelogram support that may act to keep the seating platform and the standing platform in any predetermined angular relationship. For example, if the seat support post were adjusted to give a slightly upwards tilt to the seating platform relative to the standing platform, a subsequent adjustment of the platform retainer would change the angulation of the seating platform and the standing platform relative to the tree or ground, but the slight upward tilt of the seating platform relative to the standing platform would be maintained. Additionally, the seat support post may be formed to have a plurality of adjustment receivers designed to cooperate with an adjustment pin. This configuration permits a user to quickly and easily adjust the position of the seating platform.

The seat support post may be formed to be telescoping, or have at least one hinged joint, to facilitate compact storage of the apparatus. The standing platform supports may be bent, or formed, to allow for more compact storage when folded. The standing platform supports of the present embodiment are simply bolted to the mounting structure proximal end, thereby ensuring a reliable connection that is easy to rotate.

The seating platform includes the seating platform deck, the seating platform assembly, and the support post mount. The seating platform deck may be constructed and configured in much the same way as the standing platform deck. The seating support assembly may include at least one receiver attached to the seating platform deck and at least one mount rotably attached to the mounting structure. The at least one receiver and the at least one mount are formed to cooperate with each other such that the seating platform deck and the at least one receiver may slide away from the mounting structure on the at least one mount.

One knowledgeable in the field of tree stands will recognize the functional significance of this novel feature, as tree stands are very rarely installed on perfectly vertical trees. Conventional tree stands have often not facilitated installation on the forward leaning side of a tree thereby greatly limiting the utility, as, for instance, a forward leaning tree greatly reduces the user's seating area. The user would have to lean forward to accommodate the sloping tree, thereby causing great discomfort, and potential safety issues, during the long-hours spent in the tree stand. Fortunately, the sliding seating platform deck of the present invention alleviates such problems. As previously mentioned, the seating platform deck and the at least one receiver may slide away from the mounting structure on the at least one mount, thereby moving the user's seating position away from the tree and permitting the user to sit upright.

A further embodiment incorporates at least one adjustable standing platform support. The at least one adjustable standing platform support allows the standing platform deck to move away from the mounting structure. This feature is particularly useful in the situation of a forward leaning tree, as described above, where the seating platform deck has been moved away from the mounting structure thereby reducing the amount of foot room on the standing platform. Such an adjustable standing platform support permits the user to adjust the standing platform deck in proportion to the seating platform deck, thereby maintaining the same amount of foot room regardless of the adjustments that must be made to accommodate mounting the apparatus in non-vertical trees. The at least one adjustable platform support may include a first member that is slideably received onto a second member connected to the support structure.

The receiver and the mount may be configured in any manner that permits the seating platform deck to be relocated away from the mounting structure. The mount may be bent, or formed, to allow for more compact storage when folded. The mounts may be simply bolted to the mounting structure distal end thereby ensuring a reliable connection that is easy to rotate.

The mounting structure is connected to the at least one standing platform support and to the at least one seating support mount. The mounting structure may include at least one primary support and at least one secondary support, which may easily cooperate with each other to allow adjustability in the distance between the seating platform and the standing platform. A support interconnector may be added to increase the rigidity of the apparatus, as well as serve as a mounting point for the seat support mounts. Additionally, the mounting structure may include a mounting plate, most commonly attached to each of the primary supports, to increase the rigidity of the apparatus and provide a location for engaging a tree screw that may be secured to the tree.

The mounting structure also includes a mounting chain, ultimately secured to the attachment member. The attachment member is rigidly attached to the mounting structure, and in one embodiment, to each of the primary supports. The attachment member serves as a convenient and flexible location to releasably secure the mounting chain and the at least one platform retainer. The attachment member is formed with a mounting chain receiver slot, sized and configured to cooperate with the mounting chain. The receiver slot permits one of the numerous chain links to slide into the receiver thereby blocking entry of an adjacent chain link, so that the user may easily wrap the mounting chain around the tree and engage the receiver slot. The chain tightening assembly may then be used to impart a tensile load on the mounting chain to lock the apparatus to the tree.

The chain tightening assembly may include a mounting bracket, a threaded rod, a rod limiter, a coupling having a plurality of gripping studs, and a chain interface. The mounting bracket acts to rotably join the other components of the chain tightening assembly to the attachment member. The coupling is threadedly engaged with the threaded rod and the plurality of gripping studs permit a user to apply torque on the coupling thereby imparting more tensile force on the mounting chain through the threaded rod and the chain interface. The coupling is sized such that it is retained by the mounting bracket, and not capable of passing through the hole formed in the mounting bracket for the threaded rod. Additionally, the threaded rod has a rod limiter so that the threaded rod is incapable of passing through the coupling. Therefore, as the user applies force to the plurality of gripping studs, the coupling rotates, thereby causing the threads of the coupling to travel the threads of the threaded rod, moving the threaded rod and tightening the mounting chain. The chain tightening assembly of the present invention may be used to impart at least hundreds of pounds of tensile force on the chain, thereby ensuring a solid grip on the tree. The mounting chain may be joined to the threaded rod via the chain interface, which may be a rigid connection, such as a simple weld. The mounting bracket rotates, to allow the chain tightening assembly to rotate and accommodate trees of varying diameters. This rotation allows the first end of the mounting chain to remain coaxial with the threaded rod no matter what the diameter of the tree, thereby transferring the tensile load to the mounting chain in the most effective manner.

Overall, the instant invention advances the art by allowing, among other features, sliding adjustment of both the seating platform and standing platform, thus allowing the tree stand to be easily and safely used in trees that may be substantially vertical, or in trees with an angular lean.

BRIEF DESCRIPTION OF THE DRAWINGS

Without limiting the scope of the present invention as claimed below and referring now to the drawings and figures:

Also, in the various figures and drawings, the following reference symbols and letters are used to identify the various elements described herein below in connection with the several figures and illustrations: T, R, and M.

DETAILED DESCRIPTION OF THE INVENTION

The portable tree stand of the instant invention enables a significant advance in the state of the art. The preferred embodiments of the apparatus accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
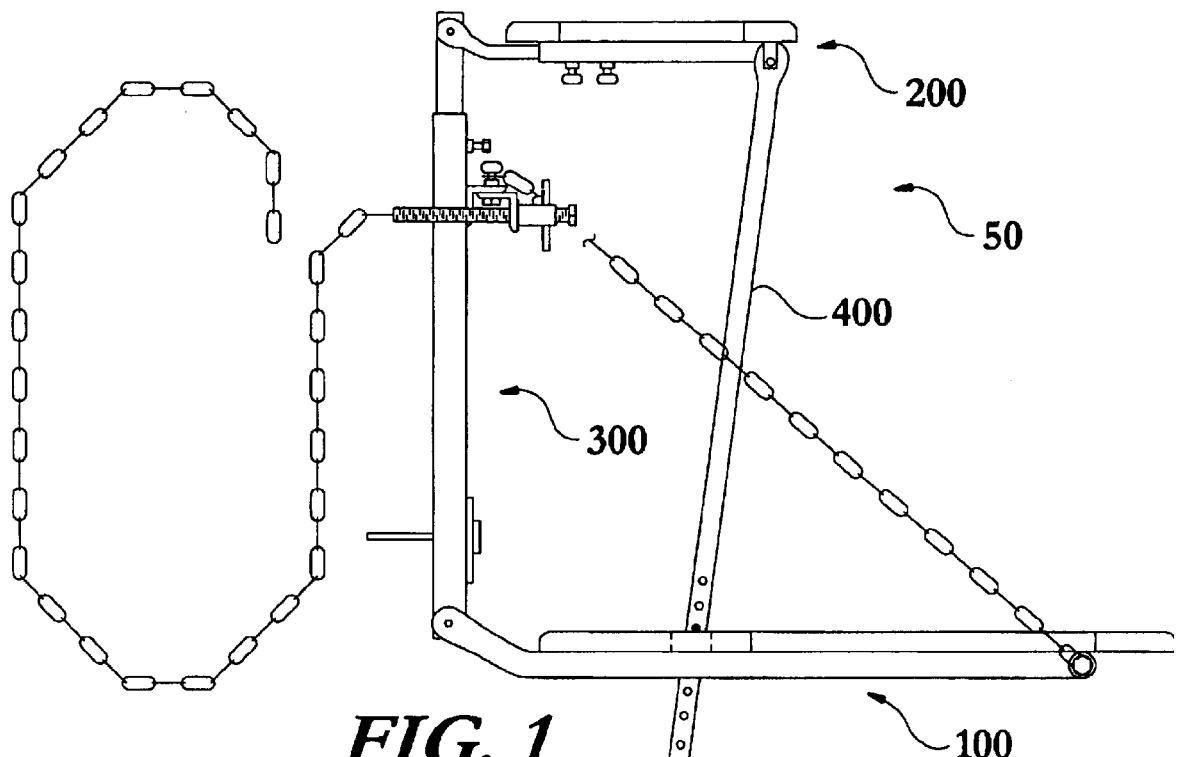
FIG. 1 is a side elevation view of a portable tree stand constructed according to the present invention.

The portable tree stand 50 of the present invention is designed to be releasably secured to a non-vertical tree and includes a standing platform 100, a seating platform 200, a mounting structure 300, and a seat support post 400 that maintains a predetermined angular relationship between the standing platform 100 and the seating platform 200, as seen in FIG. 1.

Figure 2:
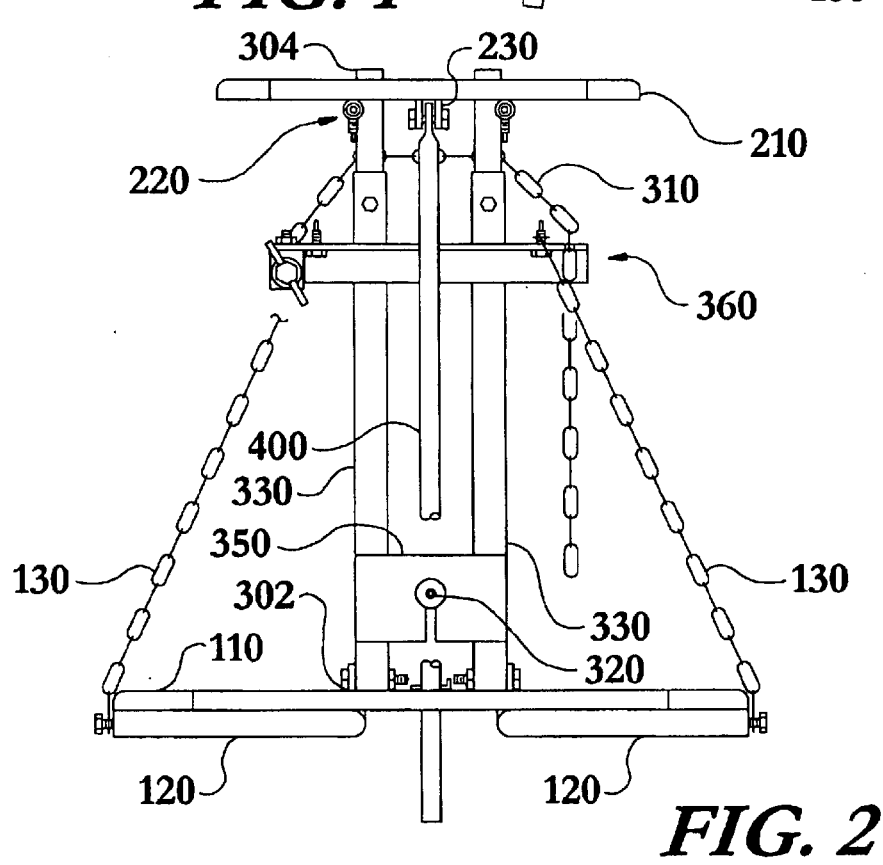
FIG. 2 is a front elevation view of a portable tree stand constructed according to the present invention.
Figure 3:
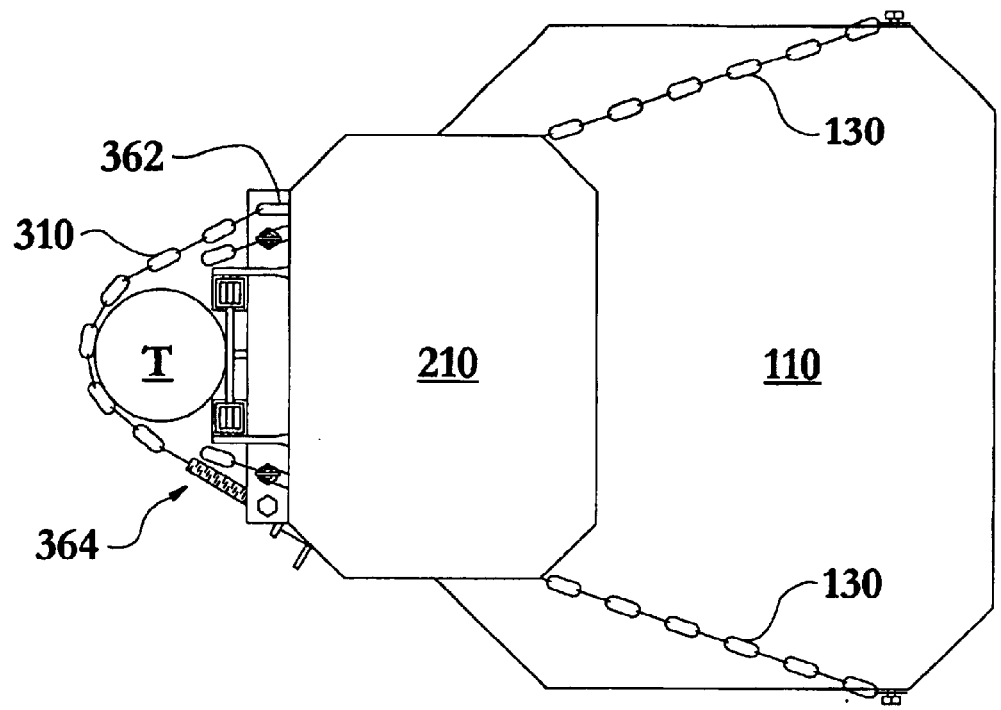
FIG. 3 is a top plan view of a portable tree stand constructed according to the present invention.
Figure 5:
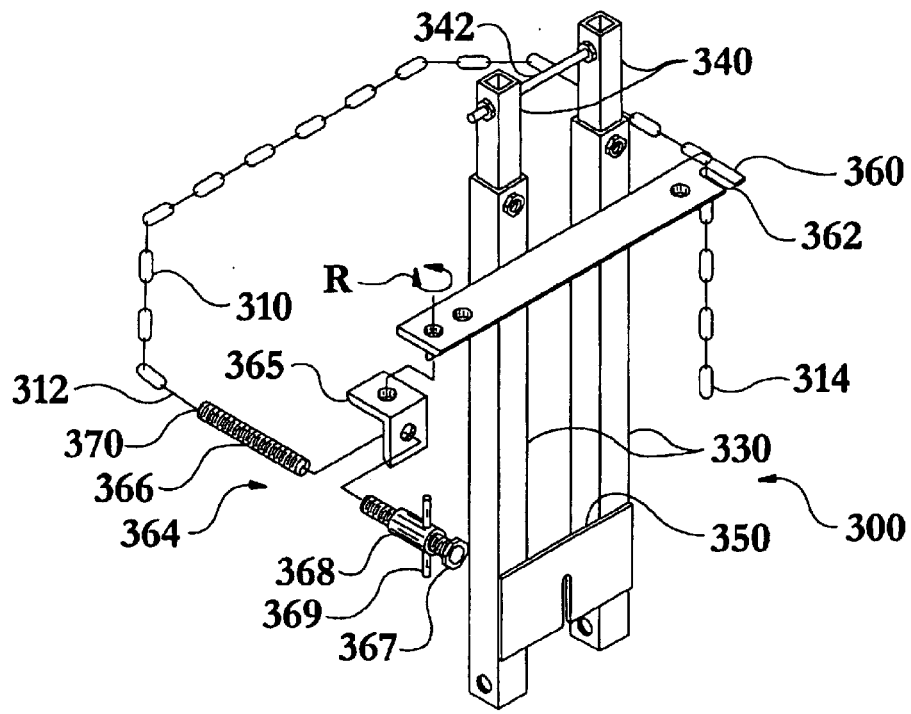
FIG. 5 is an elevated perspective view of the mounting structure constructed according to the present invention.
Figure 6:
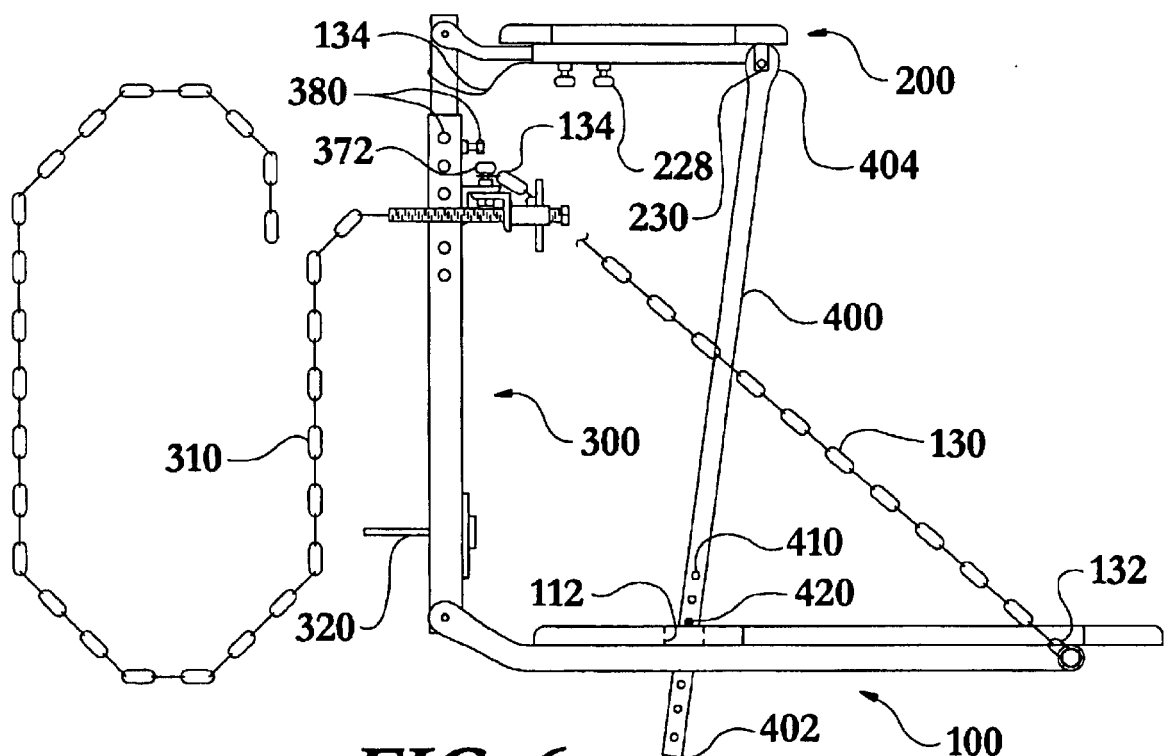
FIG. 6 is a side elevation view of a portable tree stand constructed according to the present invention.

The standing platform 100 has a standing platform deck 110, at least one standing platform support 120, a support post receiver 112, and at least one platform retainer 130 having a proximal end 132 and a distal end 134 wherein the proximal end 132 is releasably secured to the standing platform 100, as illustrated best in FIG. 6. The seating platform 200 has a seating platform deck 210, a seating support assembly 220, and a support post mount 230, as seen in FIG. 2. The mounting structure 300 has a proximal end 302, a distal end 304, a mounting chain 310 having a first end 312 and a second end 314, and an attachment member 360 to releasably secure the at least one platform retainer 130 distal end 134 and the mounting chain 310 to the mounting structure 300, seen best in FIG. 2 and FIG. 5. The seating platform assembly 200 is rotably connected substantially near the distal end 304 of the mounting structure 300 and the at least one standing platform support 120 is rotably connected substantially near the proximal end 302 of the mounting structure 300. Additionally, the attachment member 360 is connected between the proximal end 302 and the distal end 304 and includes a chain tightening assembly 364 attached to the mounting chain 310 at the first end 312 and further includes a mounting chain receiver slot 362 for releasably receiving the mounting chain 310 upon encircling the tree T. The chain tightening assembly 364 may impart a tensile load on the mounting chain 310 thereby gripping the tree T. Lastly, the seat support post 400 has a proximal end 402 and a distal end 404, wherein the seat support post 400 is rotably connected to the support post mount 230 substantially near the distal end 404 and the proximal end 402 is adjustably received by the support post receiver 112. The unique construction and assembly of these components enable the standing platform deck 110 and the seating platform deck 210 to remain in a predetermined angular relationship despite a non-orthogonal relationship between the mounting structure 300 and the standing platform deck 110 or the seating platform deck 210.

Now, referring back to the standing platform 100, it may be constructed of any number of to materials and configured in a number of ways. In one particular embodiment, the standing platform deck 110 is constructed of weather-resistant plywood, or similar oriented strand board type material. Alternatively, one with skill in the art can appreciate that the standing platform deck 110 may be constructed of expanded metal grating and composite decking type products.

Figure 7:
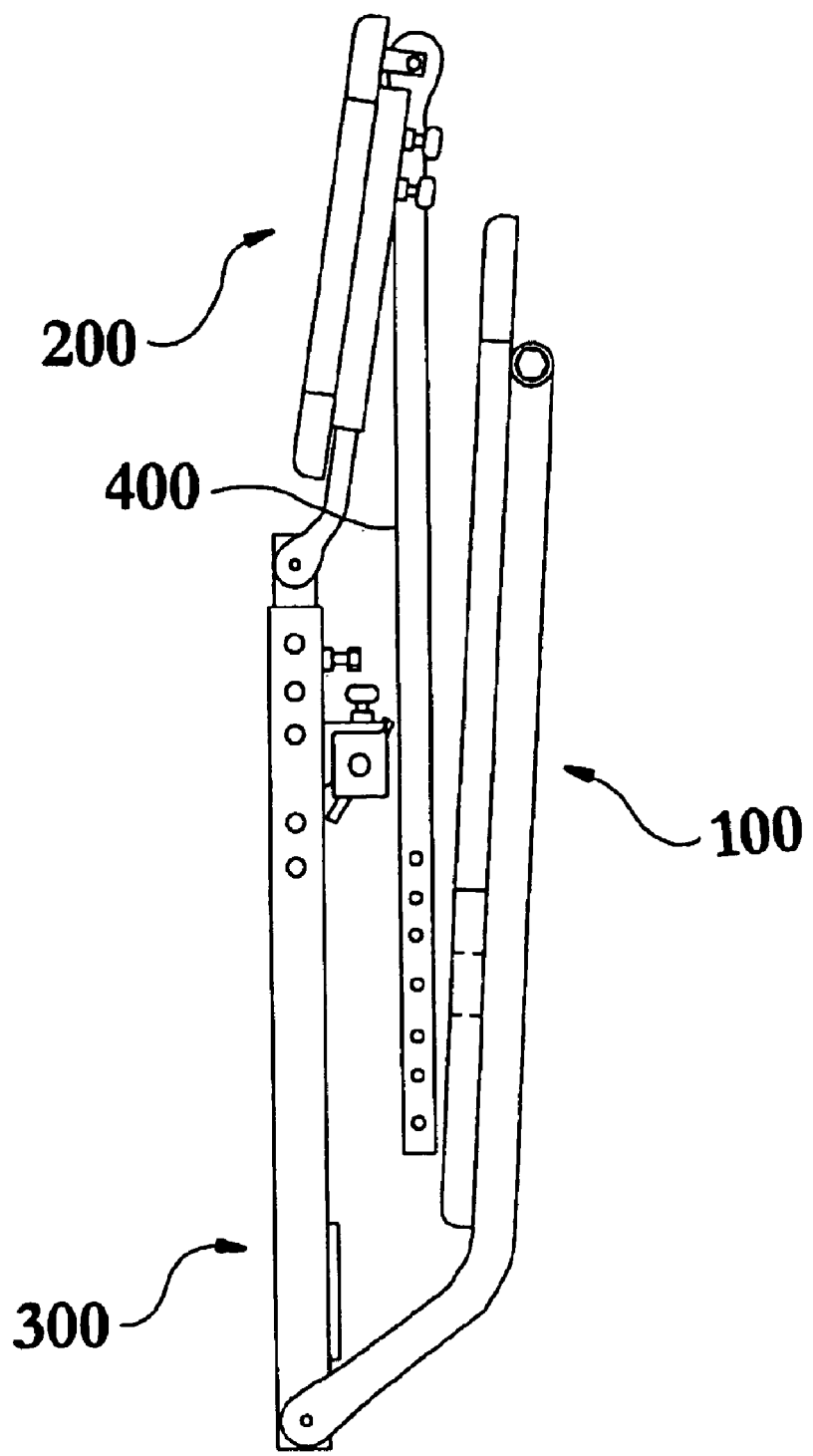
FIG. 7 is a side elevation view of a portable tree stand constructed according to the present invention in a collapsed, or folded, configuration.

Similarly, the standing platform support 120 may be constructed of any number of materials and configured in a number of ways. For example, in the embodiments illustrated in FIG. 1 through FIG. 11 the standing platform support 120 consists of two support members each rotably attached to the mounting structure proximal end 302. In this particular embodiment the standing platform supports 120 are constructed of bent ¾" electrical metallic tubing (EMT). Such EMT based construction facilitates the lightweight corrosion-resistant construction and low cost of the present invention. Alternatively, one with skill in the art can appreciate that the standing platform supports 120 may be constructed of any shape tubing, whether it is metallic, plastic, or composite. The standing platform supports 120 may be bent, or formed, as seen in FIG. 7, to allow for more compact storage when folded. The standing platform supports 120 of the present embodiment are simply bolted to the mounting structure proximal end 302 thereby ensuring a reliable connection that is easy to rotate.

The at least one platform retainer 130 acts to transfer a portion of the load on the standing platform 100 to the mounting structure 300. The embodiments illustrated in FIG. 1 through FIG. 11 illustrate the at least one platform retainer 130 as a chain, however one with skill in the art can appreciate that alternative devices, such as cable, may be used. Chain is the preferred material because is provides for easy adjustability. For instance, the chain may be easily attached to the attachment member 360 by a chain retainer 372, often a thumb-screw or wing nut assembly, which simply passes through a link in the chain, as seen in FIG. 6. Therefore, a user may easily adjust the angle of the standing platform 100 while always having a safe and secure attachment. The chain preferably has elastomeric coated links to reduce the likelihood of noise and to reduce the possibility of corrosion.

Figure 4:
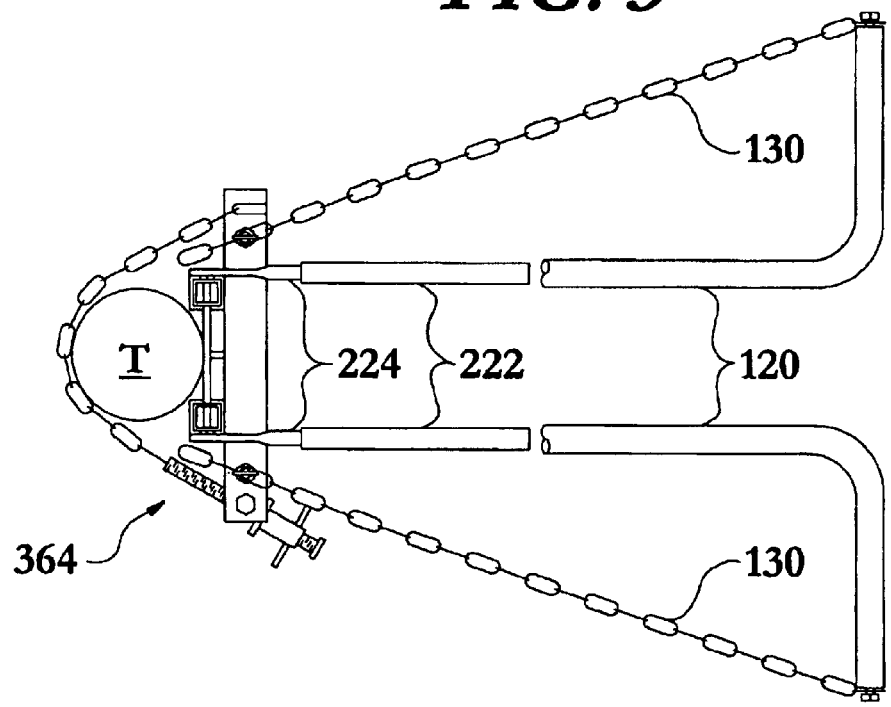
FIG. 4 is a top plan view of a portable tree stand, with the standing platform deck and the seating platform deck removed for clarity, constructed according to the present invention.

Now moving on to the seating platform 200, it consists of the seating platform deck 210, the seating platform assembly 220, and the support post mount 230, as seen in FIG. 2. The seating platform deck 210 may be constructed and configured in much the same way as the previously discussed standing platform deck 110. The seating support assembly 220 may include at least one receiver 222 attached to the seating platform deck 210 and at least one mount 224 rotably attached to the mounting structure 300. The at least one receiver 222 and the at least one mount 224 are formed to cooperate with each other such that the seating platform deck 210 and the at least one receiver 222 may slide away from the mounting structure 300 on the at least one mount 224, as seen in FIG. 4. The direction of motion M of the seating platform deck 210 is illustrated well in FIG. 8.

Figure 8:
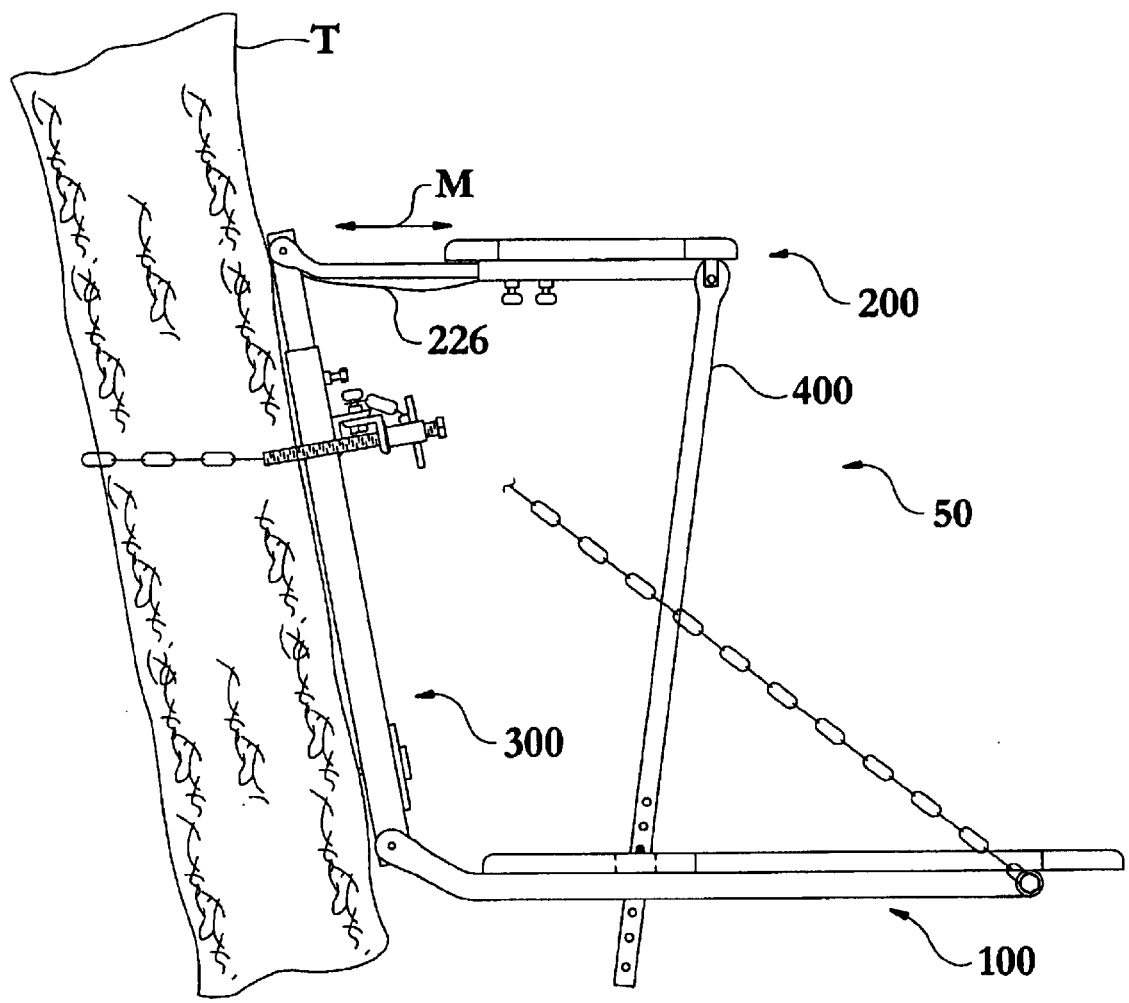
FIG. 8 is a side elevation view of a portable tree stand, mounted to a backward leaning tree, constructed according to the present invention.
Figure 9:
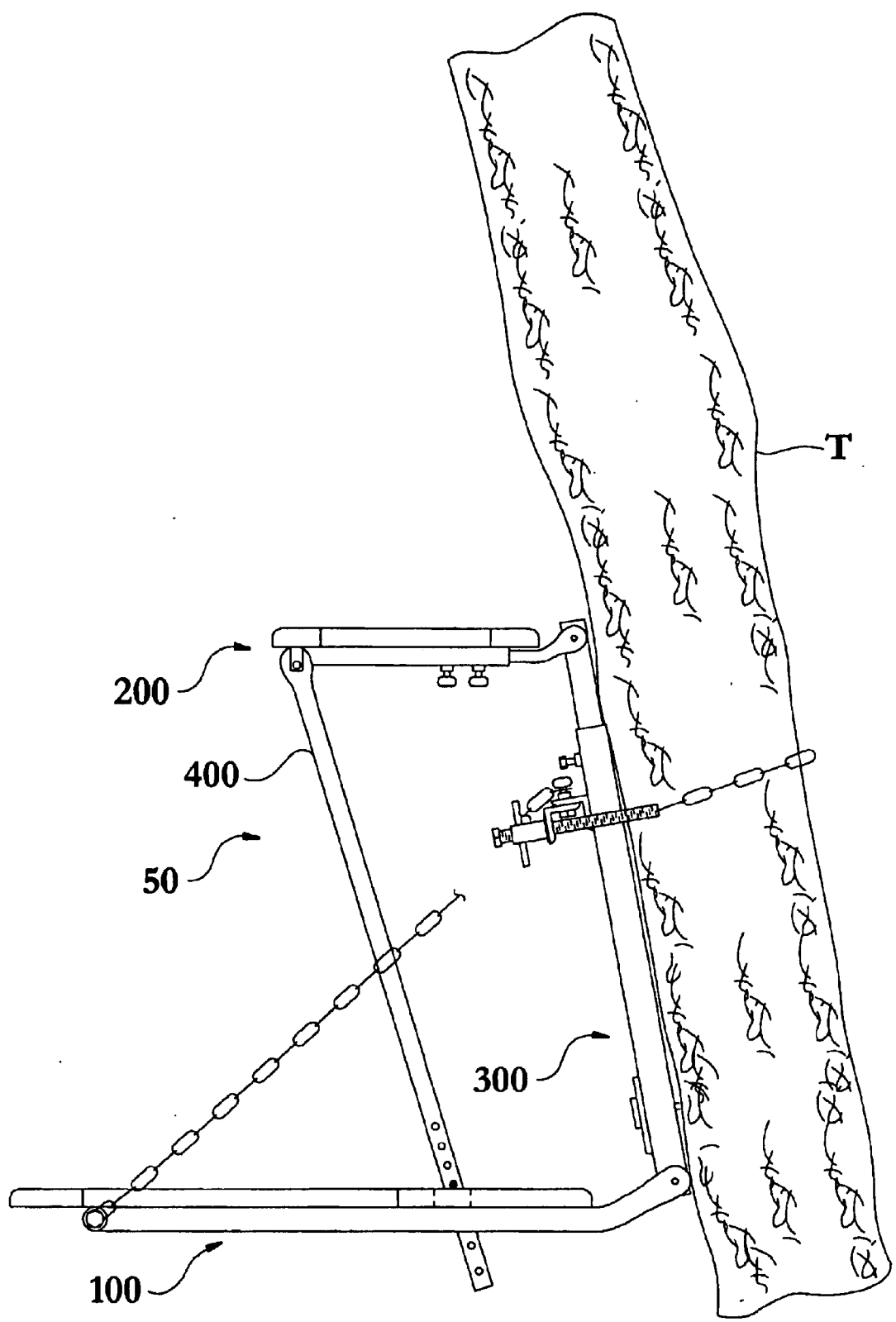
FIG. 9 is a side elevation view of a portable tree stand, mounted to a forward leaning tree, constructed according to the present invention.
Figure 10:
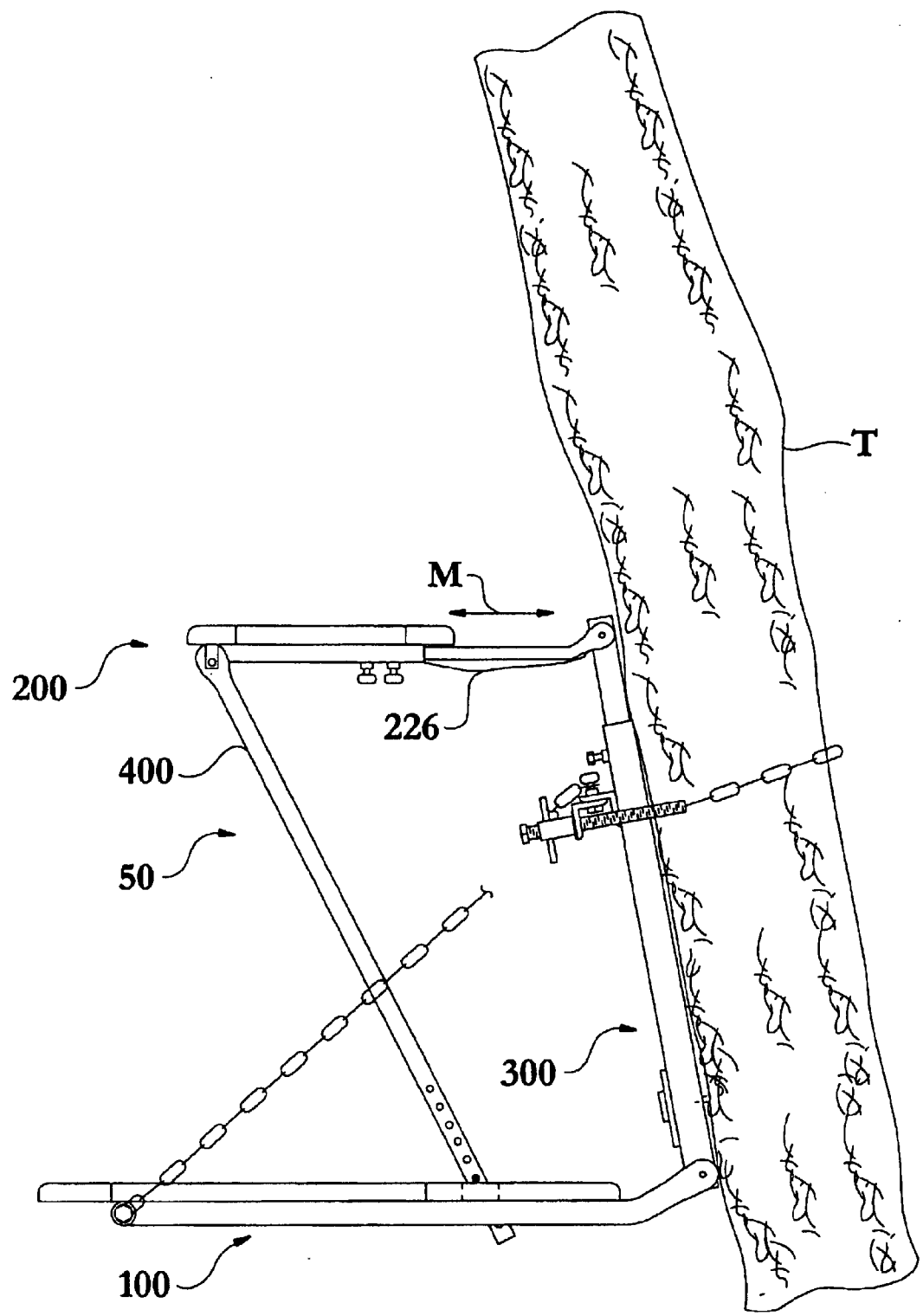
FIG. 10 is a side elevation view of a portable tree stand, mounted to a forward leaning tree, constructed according to the present invention.

The functional significance of this novel feature is illustrated in FIG. 8 through FIG. 11. As one knowledgeable in the field of tree stands will recognize, tree stands are very rarely installed on perfectly vertical trees. The apparatus 50 is shown installed on a rearward leaning (relative to the stand) tree in FIG. 8. Alternatively, the apparatus 50 is shown installed on a forward leaning (relative to the stand) tree in FIG. 9 through FIG. 11. Conventional tree stands have often not facilitated installation on a forward leaning tree thereby greatly limiting their utility. For instance, the forward leaning tree of FIG. 9 greatly reduces the user's seating area. The user would have to lean forward to accommodate the sloping tree, thereby causing great discomfort, and potential safety issues, during the long-hours spent in the tree stand. Fortunately, the sliding seating platform deck 210 of the present invention alleviates such problems, as illustrated in FIG. 10. As previously mentioned, the seating platform deck 210 and the at least one receiver 222 may slide away from the mounting structure 300 on the at least one mount 224, thereby moving the user's seating position away from the tree and permitting the user to sit upright, as seen in FIG. 8. The travel length of the seating platform deck 210 may be limited in a number of ways. In one embodiment this safety feature incorporates a translation limiter 226 in the form of at least one wire secured at one end to the mounting structure 300 and secured at the opposing end to the seating platform deck 210 or the at least one receiver 222. Alternative embodiments of the translation limiter 226 may feature structures built into the receiver 222 or the mount 224 to limit the travel. Additionally, the at least one receiver 222 and the at least one mount 224 may be releasably fixed with respect to one another with at least one locking device 228, seen in FIG. 6. The at least one locking device 228 may include simple thumb screws that pass through the at least one receiver 222 and engage the at least one mount 224.

Figure 11:
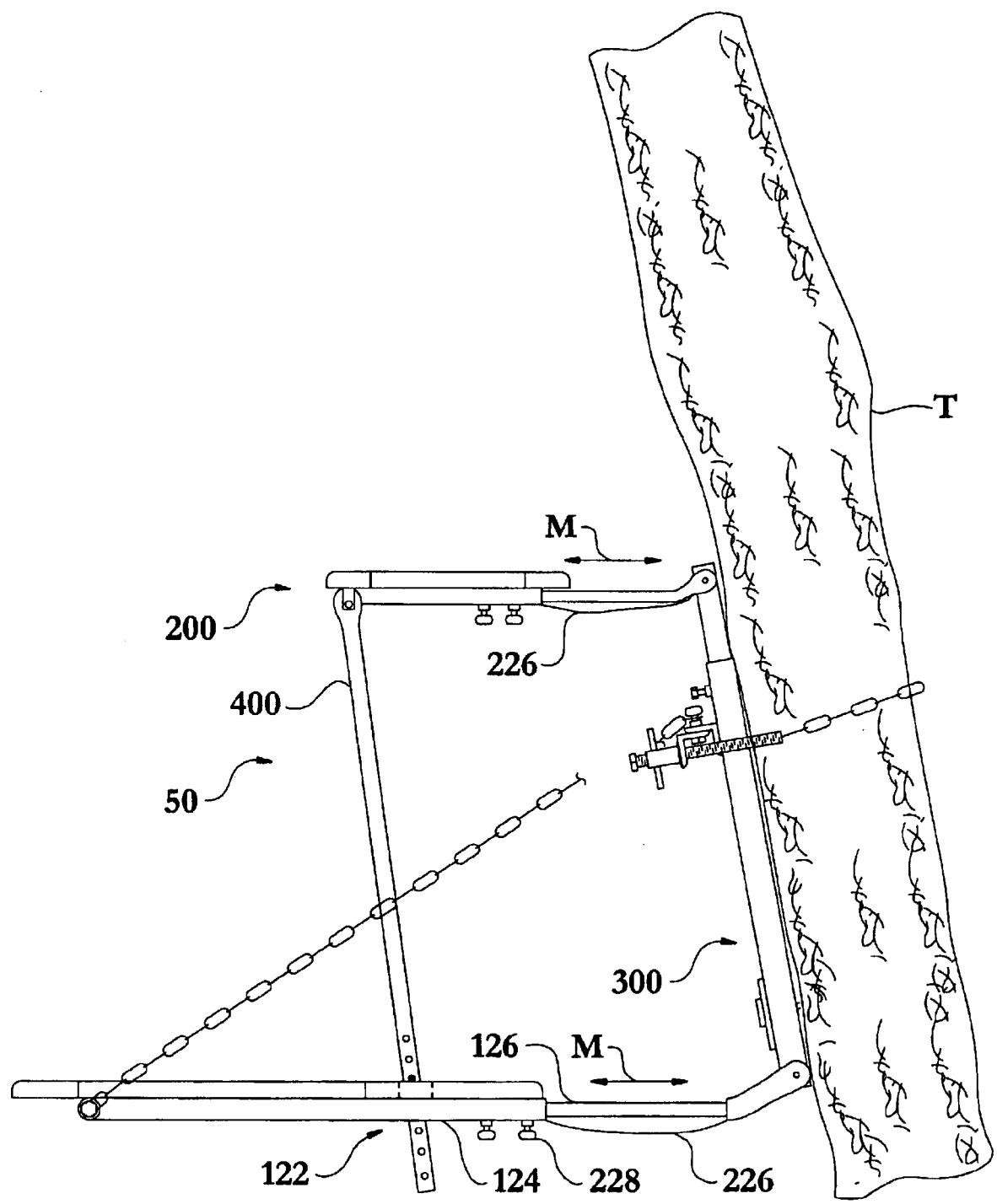
FIG. 11 is a side elevation view of a portable tree stand, mounted to a forward leaning tree, constructed according to the present invention.

A further embodiment incorporates at least one adjustable standing platform support 122, as seen in FIG. 11. The at least one adjustable standing platform support 122 allows the standing platform deck 110 to move away from the mounting structure 300. This feature is particularly useful in the situation described above, and illustrated in FIG. 10, where the seating platform deck 210 has been moved away from the mounting structure 300, thereby reducing the amount of foot room on the standing platform 100. Referring again to FIG. 11, the adjustable standing platform support 122 permits the user to adjust the standing platform deck 110 in proportion to the seating platform deck 200, thereby maintaining the same amount of foot room regardless of the adjustments that must be made to accommodate mounting the apparatus 50 in non-vertical trees. As seen in FIG. 11, the at least one adjustable platform support 122 may include a first member 124 that is slideably received onto a second member 126 that is connected to the support structure 300. This standing platform 100 embodiment may incorporate the same translation limiters 226 and materials of construction discussed above regarding the seating platform 200.

As with the standing platform support 122, the receiver 222 and the mount 224 may be constructed of EMT. Such construction is lightweight, corrosion-resistant, and offers low material and fabrication costs. However, one with skill in the art can appreciate that the receiver 222 and the mount 224 may be constructed of any shape member or tubing, whether it is metallic, plastic, or composite. Additionally, the receiver 222 and the mount 224 are not limited to the telescoping arrangement illustrated in the figures, they may be configured in any manner that permits the seating platform deck to be relocated away from the mounting structure 300. The mount 224 may be bent, or formed, as seen in FIG. 7, to allow for more compact storage when folded. Additionally, the mounts 224 of the present embodiment are simply bolted to the mounting structure distal end 304 thereby ensuring a reliable connection that is easy to rotate.

Figure 12:
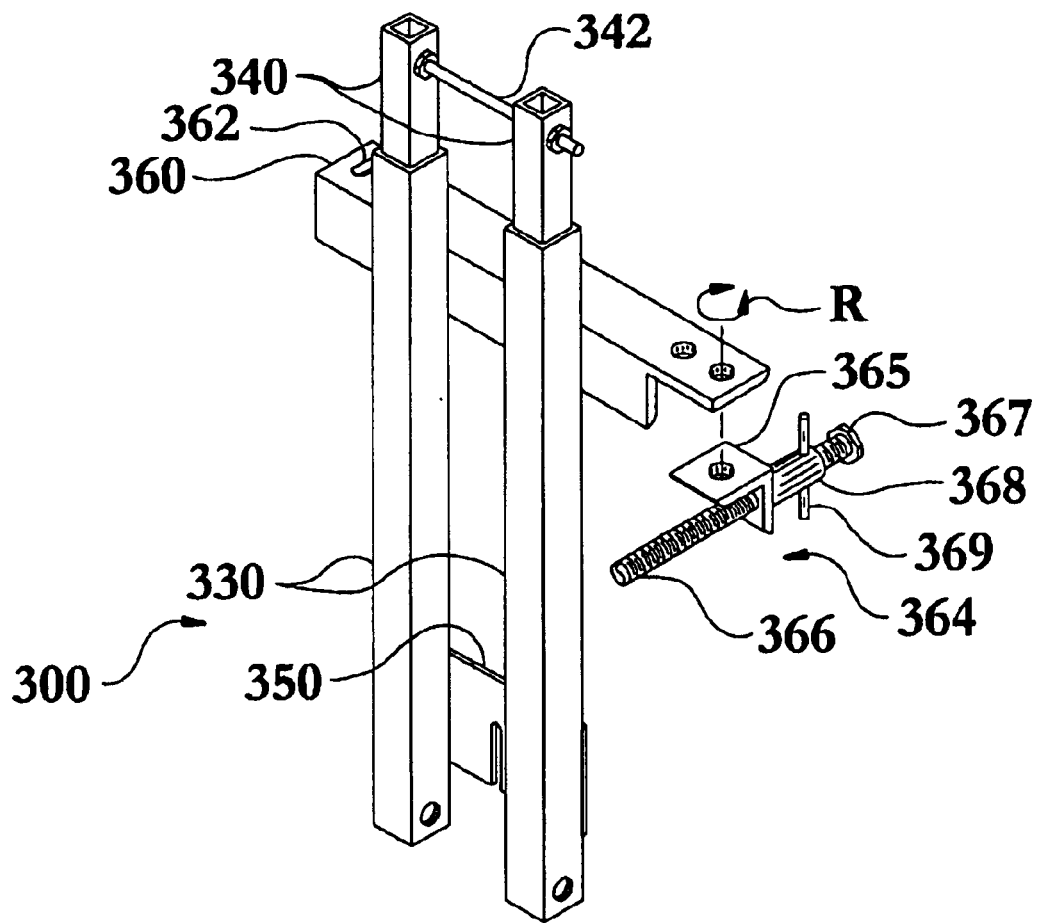
FIG. 12 is an elevated perspective view of the mounting structure constructed according to the present invention.

Next, the mounting structure 300, best illustrated in FIG. 5 and FIG. 12, is connected at the proximal end 302 to the at least one standing platform support 120, and is connected at the distal end 304 to the at least one seating support mount 224, as seen in FIG. 2. The mounting structure 300 may include at least one primary support 330 and at least one secondary support 340. The embodiment illustrated in FIG. 5 and FIG. 12 shows the at least one primary support 330 and the at least one secondary support 340 configured in complementary shapes and sizes so that they may easily cooperate with each other thereby introducing adjustability in the distance between the seating platform 200 and the standing platform 100. In one embodiment the secondary supports 340 slide into the primary supports 330, each made of tube steel, thereby offering low material and fabrication costs. One with skill in the art can appreciate that the primary and secondary supports 330, 340 may be constructed of any shape member or tubing, whether it is metallic, plastic, or composite. Additionally, the primary and secondary supports 330, 340 are not limited to the telescoping arrangement illustrated in the figures. They may be configured in any manner that permits the seating platform 200 to be adjusted nearer to, or farther away from, the standing platform 100. The apparatus 50 may include a plurality of locking devices 380 to releasably fix the relationship between the at least one primary support 330 and the at least one secondary support 340. The plurality of locking devices 380 may include setscrews or wing nuts that extend through the primary support 330 to engage the secondary support 340, or may consist of pins that extend through cooperating recesses formed in the primary support 330 and the secondary support 340, as seen in FIG. 6.

A support interconnector 342, as seen in FIG. 5, may be added to increase the rigidity of the apparatus 50, as well as serve as a mounting point for the seat support mounts 224. The support interconnector 342 may be formed of a threaded rod extending through each of the secondary supports 340. Additionally, the mounting structure 300 may include a mounting plate 350, most commonly attached to each of the primary supports 330, to increase the rigidity of the apparatus 50 and provide a location for engaging a tree screw 320 that may be secured to the tree.

The mounting structure 300 also includes a mounting chain 310 having a first end 312 and a second end 314. The mounting chain 310 is ultimately secured to the attachment member 360. The attachment member 360 is rigidly attached to the mounting structure 300, and more particularly in one embodiment, to each of the primary supports 330, as seen in FIG. 5. This rigid connection may be made using virtually any mechanical joining means, however the connection is welded in a preferred embodiment. The attachment member 360 serves as a convenient and flexible location to releasably secure the mounting chain 310 and the at least one platform retainer 130. The attachment member 360 is formed with a mounting chain receiver slot 362 sized and configured to cooperate with the mounting chain 310. The receiver slot 362 permits one of the numerous chain links to slide into the receiver thereby blocking entry of an adjacent chain link. As such, the user may easily wrap the mounting chain 310 around the tree and engage the receiver slot 362. The chain tightening assembly 364 may then be used to impart a tensile load on the mounting chain 310, thereby locking the apparatus 50 to the tree.

The chain tightening assembly 364 may include a mounting bracket 365, a threaded rod 366, a rod limiter 367, a coupling 368 having a plurality of gripping studs 369, and a chain 20 interface 370, as seen in FIG. 5 and FIG. 12. The mounting bracket 365 acts to rotably join the other components of the chain tightening assembly 364 to the attachment member 360. The mounting bracket 365 may be formed to receive the treaded rod 366. The coupling 368 is threadedly engaged with the threaded rod 366 and the plurality of gripping studs 369 permit a user to apply more torque on the coupling 368 thereby imparting more tensile force on the mounting chain 310 through the threaded rod 366 and the chain interface 370. The coupling 368 is sized such that it is retained by the mounting bracket 365, and not capable of passing through the hole formed in the mounting bracket 365 for the threaded rod 366. Additionally, the threaded rod 365 has a rod limiter 367 so that the threaded rod 366 is incapable of passing through the coupling 368. Therefore, as the user applies force to the plurality of gripping studs 369 the coupling 368 rotates thereby causing the threads of the coupling to travel the threads of the threaded rod 366, moving the threaded rod 366 and tightening the mounting chain 310. The chain tightening assembly 364 of the present invention may be used to impart at least hundreds of pounds of tensile force on the chain, thereby ensuring a solid grip on the tree. The mounting chain 310 may be joined to the threaded rod 366 via the chain interface 370, which may be a rigid connection, such as a simple weld, such that the use of a turning coupling 368 on a threaded rod 366, as seen in FIGS. 5, 6, and 8 through 12, tends to minimize any turning effect on the threaded rod 366. The rotable mounting bracket 365 rotates, as indicated by rotation indicator R in FIG. 5 and FIG. 12, to allow the chain tightening assembly 364 to rotate and accommodate trees of varying diameters. This rotation allows the first end 312 of the mounting chain 310 to remain coaxial with the threaded rod 366 no matter what the diameter of the tree, thereby transferring the tensile load to the mounting chain 310 in the most effective manner.

The attachment member 360 and the mounting bracket 365 are constructed with common angle iron in the illustrated embodiment. Such construction is extremely strong, lightweight, and offers low material and fabrication costs. However, one with skill in the art can appreciate that the attachment member 360 and the mounting bracket 365 may be constructed of structural members of virtually any shape, whether it is metallic, plastic, or composite.

Lastly, the seat support post 400 may be constructed of EMT, preferably ¾" or 1", or any shape tubing, whether it is metallic, plastic, or composite. Additionally, the seat support post 400 may be formed to have a plurality of adjustment receivers 410 designed to cooperate with an adjustment pin 420. This configuration permits a user to quickly and easily adjust the position of the seating platform 200. The configuration of the seat support post 400 relative to the seating platform 200 and the standing platform 100, creates a parallelogram support that may act to keep the seating platform 200 and the standing platform 100 in any predetermined angular relationship. For example, if the seat support post 400 were adjusted to give a slightly upwards tilt to the seating platform 200 relative to the standing platform 100, a subsequent adjustment of the platform retainer 130 would change the angulation of the seating platform 200 and the standing platform 100 relative to the tree or ground, but the slight upward tilt of the seating platform 200 relative to the standing platform 100 would be maintained. Additionally, the seat support post 400 may be formed to be telescoping, or have at least one hinged joint, to facilitate compact storage of the apparatus 50.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A portable tree stand designed to be releasably secured to a non-vertical tree, comprising:

a standing platform having a standing platform deck, at least one standing platform support, a support post receiver, and at least one platform retainer having a retainer proximal end and a retainer distal end wherein the retainer proximal end is releasably secured to the standing platform;

a seating platform having a seating platform deck, a seating support assembly, and a support post mount;

a mounting structure having a structure proximal end, a structure distal end, a mounting chain having a first end and a second end, and an attachment member to releasably secure the at least one platform retainer distal end and the mounting chain to the mounting structure, wherein the seating support assembly is rotably connected substantially near the structure distal end, the at least one standing platform support is rotably connected substantially near the structure proximal end, and the attachment member is connected between the structure proximal end and the structure distal end and includes a chain tightening assembly attached to the mounting chain at the first end and further includes a mounting chain receiver for releasably receiving the mounting chain upon encircling the tree whereby the chain tightening assembly may impart a tensile load on the mounting chain thereby gripping the tree; and a seat support post having a post proximal end and a post distal end, wherein the seat support post is rotably connected to the support post mount substantially near the post distal end and the post proximal end is adjustably received by the support post receiver, such that the standing platform deck and the seating platform deck may remain in a predetermined angular relationship despite a non-orthogonal relationship between the mounting structure and the standing platform deck or the seating platform deck.

2. The portable tree stand of claim 1, wherein the seating support assembly includes at least one receiver attached to the seating platform deck and at least one mount rotably attached to the mounting structure, wherein the at least one receiver and the at least one mount are formed to cooperate with each other such that the seating platform deck and the at least one receiver may slide away from the mounting structure on the at least one mount.

3. The portable tree stand of claim 2, further including a translation limiter to limit the travel range of the seating platform deck and the at least one receiver.

4. The portable tree stand of claim 1, wherein the mounting structure includes at least one primary support to which the standing platform is rotably connected and at least one secondary support to which the seating platform is rotably connected, whereby the at least one primary support and the at least one secondary support are configured to cooperate with each other such that a distance between the standing platform and the seating platform is adjustable.

5. The portable tree stand of claim 1, wherein the at least one standing platform support is at least one adjustable platform support having a first member and a second member configured to cooperate thereby permitting the standing platform deck to slide away from the mounting structure, and further including at least one translation limiter.

6. The portable tree stand of claim 1, wherein the chain tightening assembly includes a threaded rod having a rod limiter at a first end and attached to a chain interface at a second end, a coupling, having at least one gripping stud, threadedly engaged to the threaded rod, and a mounting bracket for receiving the threaded rod and rotably joining the assembly to the attachment member.

7. The portable tree stand of claim 1, wherein the seat support post is formed with at least one adjustment receiver sized to cooperate with an adjustment pin so as to fix the position of the seat support post in relation to the standing platform.

8. The portable tree stand of claim 1, wherein the mounting structure further includes a mounting plate that releasably connects the mounting structure to a tree screw fixed in the tree.

9. A portable tree stand designed to be releasably secured to a non-vertical tree, comprising:
   a standing platform having a standing platform deck, at least one standing platform support, a support post receiver, and at least one platform retainer having a retainer proximal end and a retainer distal end wherein the retainer proximal end is releasably secured to the standing platform;
   a seating platform having a seating platform deck, a seating support assembly including at least one receiver attached to the seating platform deck and at least one mount rotably attached to a mounting structure, wherein the at least one receiver and the at least one mount are formed to cooperate with each other such that the seating platform deck and the at least one receiver may slide away from the mounting structure on the at least one mount, and a support post mount;
   the mounting structure having a structure proximal end, a structure distal end, a mounting chain having a first end and a second end, and an attachment member to releasably secure the at least one platform retainer distal end and the mounting chain to the mounting structure, wherein the seating support assembly is rotably connected substantially near the structure distal end, the at least one standing platform support is rotably connected substantially near the structure proximal end, and the attachment member is connected between the structure proximal end and the structure distal end and includes a chain tightening assembly attached to the mounting chain at the first end and further includes a mounting chain receiver for releasably receiving the mounting chain upon encircling the tree whereby the chain tightening assembly may impart a tensile load on the mounting chain thereby gripping the tree; and wherein the mounting structure includes at least one primary support to which the standing platform is rotably connected and at least one secondary support to which the seating platform is rotably connected, whereby the at least one primary support and the at least one secondary support are configured to cooperate with each other such that a distance between the standing platform and the seating platform is adjustable; and
   a seat support post having a post proximal end and a post distal end, wherein the seat support post is rotably connected to the support post mount substantially near the post distal end and the post proximal end is adjustably received by the support post receiver, such that the standing platform deck and the seating platform deck may in a predetermined angular relationship despite a non-orthogonal relationship between the mounting structure and the standing platform deck or the seating platform deck.

10. The portable tree stand of claim 9, further including a translation limiter to limit the travel range of the seating platform deck and the at least one receiver.

11. The portable tree stand of claim 9, wherein the at least one standing platform support is at least one adjustable platform support having a first member and a second member configured to cooperate thereby permitting the standing platform deck to slide away from the mounting structure, and further including at least one translation limiter.

12. The portable tree stand of claim 9, wherein the chain tightening assembly includes a threaded rod having a rod limiter at a first end and attached to a chain interface at a second end, a coupling, having at least one gripping stud, threadedly engaged to the threaded rod, and a mounting bracket for receiving the threaded rod and rotably joining the assembly to the attachment member.

13. The portable tree stand of claim 9, wherein the seat support post is formed with at least one adjustment receiver sized to cooperate with an adjustment pin so as to fix the position of the seat support post in relation to the standing platform.

14. The portable tree stand of claim 9, wherein the mounting structure further includes a mounting plate that releasably connects the mounting structure to a tree screw fixed in the tree.

15. A portable tree stand designed to be releasably secured to a non-vertical tree, comprising:
   a standing platform having a standing platform deck, at least one standing platform support, wherein the at least one standing platform support is at least one adjustable platform support having a first member and a second member configured to cooperate thereby permitting the standing platform deck to slide away from a mounting structure, a support post receiver, and at least one platform retainer having a retainer proximal end and a retainer distal end wherein the retainer proximal end is releasably secured to the standing platform;
   a seating platform having a seating platform deck, a setting support assembly including at least one receiver attached to the seating platform deck and at least one mount rotably attached to the mounting structure, wherein the at least one receiver and the at least one mount are formed to cooperate with each other such that the seating platform deck and the at least one receiver may slide away from the mounting structure on the at least one mount, and a support post mount;
   the mounting structure having a structure proximal end, a structure distal end, a mounting chain having a first end and a second end, and an attachment member to releasably secure the at least one platform retainer distal end and the mounting chain to the mounting structure, wherein the seating support assembly is rotably connected substantially near the structure distal end, the at least one standing platform support is rotably connected substantially near the structure proximal end, and the attachment member is connected between the structure proximal end and the structure distal end and includes a chain tightening assembly attached to the mounting chain at the first end and further includes a mounting chain receiver for releasably receiving the mounting chain upon encircling the tree whereby the chain tightening assembly may impart a tensile load on the mounting chain thereby gripping the tree; and wherein the mounting structure includes at least one primary support to which the standing platform is rotably connected and at least one secondary support to which the seating platform is rotably connected, whereby the at least one primary support and the at least one secondary support are configured to cooperate with each other such that a distance between the standing platform and the seating platform is adjustable; and a seat support post having a post proximal end and a post distal end, wherein the seat support post is rotably connected to the support post mount substantially near the post distal end and the post proximal end is adjustably received by the support post receiver, such that the standing platform dock and the seating platform deck may remain in a predetermined angular relationship despite a non-orthogonal relationship between the mounting structure and the standing platform deck or the seating platform deck.

16. The portable tree stand of claim 15, further including a translation limiter to limit the travel range of the seating platform deck and the at least one receiver.

17. The portable tree stand of claim 15, wherein the chain tightening assembly includes a threaded rod having a rod limiter at a first end and attached to a chain interface at a second end, a coupling, having at least one gripping stud, threadedly engaged to the threaded rod, and a mounting bracket for receiving the threaded rod and rotably joining the assembly to the attachment member.

18. The portable tree stand of claim 15, wherein the seat support post is formed with at least one adjustment receiver sized to cooperate with an adjustment pin so as to fix the position of the seat support post in relation to the standing platform.

19. The portable tree stand of claim 15, wherein the mounting structure further includes a mounting plate that releasably connects the mounting structure to a tree screw fixed in the tree.

20. The portable tree stand of claim 15, further including a translation limiter to limit the travel range of the standing platform deck and the at least one receiver.

* * * * *